Patented Aug. 25, 1953

2,650,209

UNITED STATES PATENT OFFICE 2,650,209

SYNTHETIC DRYING OILS AND METHODS FOR PREPARING SAME

Joseph F. Nelson, Rahway, and Anthony H. Gleason, Westfield, N. J., assignors to Standard Oil Development Company, a corporation of Delaware No Drawing. Application December 1, 1950, Serial No. 198,742

5 Claims. (Cl. 260—63)

The present invention relates to a new type of synthetic drying oil prepared by reacting a carbonyl-containing polymer with cyclopentadiene or other unsaturated monomers containing an active methylene group.

The drying oils of the invention are characterized by a high proportion of conjugated double bonds and when desired may be prepared in a form wherein all unsaturation is contained in side chains, thereby giving rise to excellent drying properties and at the same time also to outstanding aging characteristics. In its most specific aspect, the invention relates to a drying oil prepared by condensing cyclopentadiene with an acetylated styrene-isobutylene copolymer of relatively low molecular weight, though it will be apparent that the present inventive concept may also be applied to reactions of unsaturated active methylene compounds with other acylated polymers.

It is well known that many drying oils, particularly many of those prepared from petroleum, contain too much unsaturation, and especially too much unsaturation of the non-conjugated type. In the case of these non-conjugated materials a large amount of unsaturation is required in order to realize satisfactory drying rates. However, as a result considerable unsaturation remains in the polymer even after drying, and this residual unsaturation thereafter facilitates oxidative scission of the backbone of such polymeric molecules, thereby impairing the aging characteristics of protective films made therefrom.

According to the present invention new synthetic drying oils may be prepared which have all or almost all of the unsaturation not only in conjugated form, but also located in side groups outside of the principal linear polymeric chain, and these polymers are therefore characterized by unusually good drying rates and high resistance to oxidative breakdown on aging.

Basically, the object of the present invention is accomplished by introducing unsaturated side chains, particularly conjugated ones, into a linear polymer having a suitable molecular weight and preferably having little or no unsaturation of its own. Specifically, this object may be accomplished by condensing an essentially saturated linear polymer having a limited number of reactive carbonyl groups along its chain with an unsaturated monomer having an active methylene group, and preferably having a carbon structure adapted to give rise to conjugated double bonds after condensation with a carbonyl group. Notably cyclopentadiene, indene, pentadiene-1,4 and their methylene containing homologs may be used. In lieu of cyclopentadiene, substituted cyclopentadienes such as the methyl, ethyl, and dimethyl homologs are particularly good alternative materials for reacting with the carbonyl compound, provided that the substituent is not on the methylene group.

One way of obtaining a polymer having the proper number of carbonyl groups is to copolymerize an alkyl or aryl substituted ethylene having 3 to 10 carbon atoms, such as propylene, isobutylene, butene-1, the amylenes, the decenes, styrene, ring-substituted mono- or di-methyl styrenes or ethyl styrenes or chlorostyrenes, with a monoethylenically unsaturated ketone or aldehyde having 3 to 8 carbon atoms, such as acrolein, methyl vinyl ketone, isopropenyl methyl ketone and the like. In particular, copolymers of about 1 to 5 parts, or preferably about 2 parts of styrene and 1 part of methyl vinyl ketone, prepared in aqueous emulsion or in a suitable diluent in a known manner with the aid of a peroxide catalyst, are suitable for the purposes of the present invention, a relatively high proportion of ketone being required to give a base material sufficiently soft and flexible for the intended end use as a protective coating. Alternatively a similarly soft base material may be prepared, for example, by copolymerizing a hydrocarbon mixture containing about 25 to 75% styrene and 75 to 25% isobutylene with about 10 to 50% of the vinyl ketone based on the styrene-isobutylene mixture. A homopolymer of a vinyl ketone may also be used, but in such a case it is advisable to condense only about 5 to 10% of the total carbonyl groups with cyclopentadiene or other unsaturated methylene compound. It is also possible to use as the base material high pressure copolymers of carbon monoxide and ethylene or other suitable monomers, prepared in the manner described for instance in British Patent 583,172. The various polymers, copolymers and tripolymers forming the base material of this invention may be made by any suitable technique such as by polymerization in emulsion, in solution, in mass, or by polymerization under high pressure, and catalysts known to be appropriate for the particular type of operation may be employed. Such catalysts may be organic peroxides such as benzoyl or cumene peroxide, inorganic peroxides or per-salts such as potassium persulfate or perborate, Friedel-Crafts catalysts such as solid aluminum chloride or alkyl chloride solutions thereof, modified Friedel-Crafts catalysts such as ether complexes thereof, and so on, as is well known per se.

However, in view of the relative difficulty of preparing the aforesaid carbonyl-containing polymers directly by polymerization in some cases, it has been found that it is especially advantageous for the purposes of the present invention to prepare the carbonyl-containing base material by acylation of saturated polymers containing a limited number of benzene rings. In this fashion it is easily possible to prepare a base material having an optimum balance of functional groups found desirable for the synthesis of the desired drying oil, namely the proper amount of carbonyl groups required for condensation with cyclopentadiene, alkyl groups to give flexibility to the eventual surface coating, and aryl groups to permit the desired degree of acylation during synthesis and in the finished product to absorb ultra violet light and convert it into less harmful forms of energy so as to produce a surface coating characterized by superior light stability.

Polymers particularly suited for use in the present invention are prepared with the aid of a Friedel-Crafts catalyst at temperatures below 0° C., from feeds containing an aliphatic olefin of three to eight or more carbon atoms such as isobutylene, 2-methyl-1-butene, or isooctene and a polymerizable cyclic compound such as styrene, paramethyl styrene, indene and the like. These polymers as well as their method of preparation are well known per se and are described, for example, in U. S. Patent 2,274,749; polymers having about 40 to 95%, or preferably 70 to 90% of combined isobutylene and 60 to 5%, or preferably 30 to 10% of combined styrene, and having a true molecular weight between about 500 and 15,000 are especially preferred. The relatively low molecular weight preferred for the purposes of the present invention is readily obtained by adding a minor amount of a reaction poison, e. g. 2 to 10% of butene-1 or butene-2 to the polymerizable feed, and also by carrying out the polymerization reaction at temperatures between about +10° C. and −68° C., preferably between 0° C. and −40° C.

Another type of polymer suited here can be prepared by copolymerizing styrene and acrylonitrile as described in U. S. Patent 2,140,048 (Example 12), products having a combined styrene content between 5 and 60% and a molecular weight of about 500 and 15,000 again being especially advantageous.

The agent used for acylating the aforementioned polymers may be selected from a wide variety of materials having the general formula $R(COX)_n$ where R is a hydrocarbon group of 1 to about 18 carbon atoms, X is a halogen such as chlorine or bromine and $n$ is an integer from 1 to 3, preferably 1 to 2. The preferred acylating agent is acetyl chloride, but other agents such as propionyl, stearyl, benzoyl, oleyl, linoleyl, dilinoleyl, sebacyl and phthalyl chloride may be used as well.

The acylation of the copolymers is known per se and is described, for instance, in U. S. Patent 2,500,082, the amount of acylating agent used for purposes of the present invention being preferably equal to about 0.2 to 1 times the number of mol equivalents of the aromatic compound present in the polymer to be acylated. As will be understood by those skilled in the art, the optimum amount of acylating agent is determined in each case by the relative proportion of combined aromatic present in the polymer, the degree of eventual unsaturation desired in the end product and consequently the degree of acylation required, as well as by the molecular weight and reactivity of the acylating agent. The resulting carbonyl-containing copolymer has a linear chain whose molecular weight is preferably within the range between 1,000 and 20,000, the molecular weight being only slightly more than the molecular weight of the starting copolymer, except where a dibasic acylating agent such as phthalyl chloride is used, in which event the molecular weight is increased by a factor of at least two or more. In the latter eventuality, it accordingly is desirable to start with a polymer having a molecular weight sufficiently low, and a proportion of the aromatic nuclei sufficiently low to prevent gelation when reacted with phthalyl chloride in the amount necessary for the introduction of the required number of carbonyl groups.

For best final results the synthetic carbonyl-containing polymeric material of the type described above, whether prepared by direct polymerization or by acylation of a polymer separately prepared, should have a molecular weight within the aforesaid range, should preferably contain 5 to 60% of combined aromatic groups, preferably 10 to 30% of styrene, about 90 to 40% of saturated aliphatic hydrocarbon groups and about 3 to 30% of carbonyl groups. In accordance with the invention this polymeric material is then reacted with cyclopentadiene or the alternative materials mentioned earlier herein. The reaction is best carried out with the aid of a suitable condensing agent such as a metal alcoholate. Useful condensing agents include sodium amylate, sodium octylate or broadly speaking a $C_2$ to $C_{10}$ alcoholate of a metal such as sodium, potassium, calcium, magnesium and the like. Alcoholates of at least five carbon atoms are preferred as the lower alcoholates have relatively low solubilities in the reaction mixture and are consequently inefficient. In carrying out the reaction, the carbonyl-containing polymer is first dissolved in toluene, naphtha or other suitable inert solvent in a concentration of about 5 to 25%, then cyclopentadiene is added thereto in an amount calculated to give a product having the desired amount of unsaturation. Usually about 0.5 to 1.2 mole of cyclopentadiene is added per mole of carbonyl groups present in the polymer, about one mole of alcoholate condensing agent being further added to the mixture for each mole of cyclopentadiene. The reaction mixture is maintained at 10 to 50° C., preferably 15 to 30° C. for about 2 to 24 hours. The optimum concentration of the initial polymer solution is determined primarily by viscosity considerations, as the reaction rate tends to drop off unduly with increasing dilution, whereas in excessively viscous solutions the reaction tends to be erratic and difficult to control. It will be noted that if cyclopentadiene is used in the condensation, a polymeric product is produced having highly reactive side groups of three conjugated double bonds attached to an aromatic nucleus. A reaction of this sort can be represented as follows:

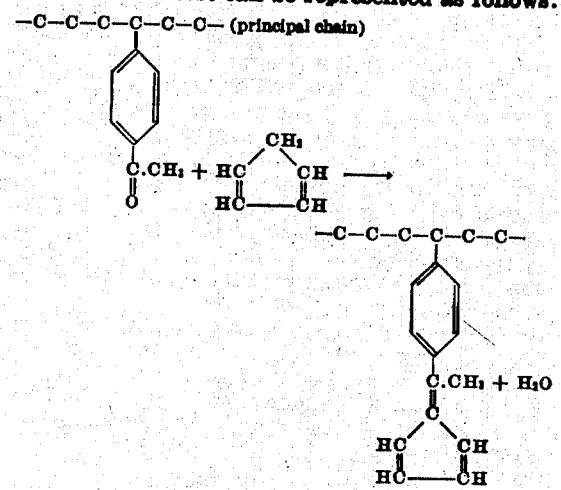

Due to the resulting triple unsaturation which is attached to about every fifteenth to fortieth carbon atom of the principal chain, the obtained drying oil is characterized by an exceptionally rapid drying rate.

This invention is particularly illustrated by the following example, it being understood that all quantities and proportions are expressed throughout this specification on a weight basis, unless otherwise stated.

*Example*

A saturated copolymer of styrene and isobutylene was prepared by mixing 100 g. styrene, 400 g. isobutylene and 65 g. butene-2 in 4 liters of methyl chloride and adding to this a catalyst solution composed of 5 g. anhydrous aluminum chloride in 500 ml. methyl chloride. The methyl chloride keeps the reaction temperature at approximately —20° C. and the butene-2 serves as a chain terminator to keep the molecular weight of the product within the desired limits so as to give an oily rather than a rubbery copolymer. The reaction was quenched with isopropanol, the copolymer redissolved and again precipitated to get rid of the aluminum chloride and vacuum stripped to give a product containing approximately 15% styrene. The true molecular weight of the copolymer was about 5,000.

A solution of 100 grams of the above copolymer in 300 ml. of carbon tetrachloride was added to an ice-cooled suspension of 54 g. anhydrous aluminum chloride and 30 g. acetyl chloride in 250 ml. carbon tetrachloride over a period of two hours. After an additional hour's stirring the suspension was decomposed with ice and hydrochloric acid, water washed and dried. The carbon tetrachloride was displaced with toluene and thus a solution containing about 10% of the desired carbonyl-containing base material in toluene was obtained.

A toluene solution (200 ml.) of sodium octylate prepared from 3.5 g. metallic sodium and 40 g. branched octyl alcohol (Oxo) was added to the above toluene solution of acetylated copolymer and 25 g. of freshly prepared cyclopentadiene. Over a period of several hours stirring at 30–35° C. a noticeable turbidity developed indicating the elimination of water from the condensing reactants and the formation of insoluble aqueous caustic. A slight excess of acetic acid was finally added to the mixture which was then filtered through powdered silica (Hyflo) to give a clear, slightly reddish polymer solution. Reduced to 45% non-volatile matter (polymer) and treated with 0.3% lead and 0.3% manganese (as naphthenates), a drying oil or synthetic varnish was obtained. When applied to steel panels, this varnish gave a coating which was set to touch in about one hour at room temperature, nearly tack free in two hours, and completely tack free in six hours. The resulting films had very good resistance to chemicals such as water, grease, soap and caustic, as well as to ultra-violet light and possessed a high degree of flexibility. In fact the flexibility, even after 16 weeks or longer, was superior to that of any known varnish tested, the result being undoubtedly due to the exceptionally small extent of degradation which the polymer of the invention suffers on aging. Films of the same varnish baked for one hour at 250° F. were characterized by still better resistance to water, grease, caustic and soap and also by excellent flexibility.

From the foregoing it can be seen that an entirely new type of synthetic drying oil having unusually good drying characteristics and excellent aging properties can be prepared in accordance with the present invention. Moreover, by allowing a wide range of choice as to the constitution of the base material, a drying oil of almost any hardness, flexibility, light resistance, drying rate, and soon can be prepared to meet any specific end use by following the present teaching. A drying oil having a particularly favorable balance of properties can be prepared according to this invention from an oily copolymer of about 10 to 30% styrene and 90 to 70% of isobutylene having a Staudinger molecular weight of about 2,000 to 15,000, by acetylating it with about 0.2 to 1 mole of acetyl or other acyl chloride per mole of combined styrene and subsequently condensing the acetylated polymer with about 0.5 to 1.2 moles of cyclopentadiene per mole keto or carbonyl group present in the polymer. Normally, of course, substantially all of the keto groups present in the polymer are reacted, as the introduction of keto groups in excess of the amount required for subsequent condensation with the diene represents an unnecessary expense without offering any commensurate benefit. The resulting product can be applied to solid surfaces, notably metal or wood, and gives excellent protective films.

In addition to the specific examples and express suggestions made herein, it will be understood by those skilled in the art that various alternatives and modifications are possible in obtaining or using the products suggested herein without departing from the spirit of the present invention or from the scope of the appended claims. For instance, the new synthetic drying oils may be diluted with solvents such as solvent naphtha, mineral spirits or other hydrocarbons, blended with natural drying or semi-drying oils such as linseed, tung and other glyceride oils containing linoleic or linolenic esters, with ester gum, alkyds and other resins, bodied with modified phenolics, etc., and they may be compounded in the usual manner with pigments, driers and the like as is conventional in the art of formulating paints, varnishes, enamels and so on. Furthermore, instead of being used in solution form, the drying polymers may also be applied in the form of aqueous dispersions. The latter expedient is especially advantageous when the polymers used are of a relatively high molecular weight, such as The scope and spirit of the present invention is particularly pointed out in the appended claims.

We claim:

1. A process for preparing a drying oil which comprises mixing a cyclopentadiene with an acylated linear copolymer of about 10 to 30% styrene and 90 to 70% isobutylene having a molecular weight between about 1,000 and 20,000 and containing about 0.2 to 1 mole of combined acyl groups per mole of aromatic styrene nuclei of the copolymer chain, about 0.5 to 1.2 moles of the cyclopentadiene being present in the reaction mixture per mole of combined acyl groups and maintaining the mixture at 10° to 50° C., in the presence of a metal alcoholate condensing agent until the cyclopentadiene and the carbonyl groups of the acylated copolymer are condensed with the elimination of water.

2. A process according to claim 1 wherein the acyl groups of the copolymer are phthalyl groups.

3. A process for preparing a drying oil which comprises dissolving in 100 parts of an inert hydrocarbon solvent 5 to 25 parts of an acetylated linear copolymer of about 10 to 30% combined styrene and 90 to 70% combined isobutylene based on total combined hydrocarbon monomers, said copolymer having a molecular weight between 2,500 and 15,000 and containing 0.5 to 2 moles of combined acetyl groups per mole of combined styrene, adding to the resulting solution about 0.5 to 1.2 moles of cyclopentadiene per mole of acetyl groups of the copolymer and heating the mixture at about 30 to 35° C. in the presence of a metal alcoholate condensing agent until the cyclopentadiene and the carbonyl groups of the acylated copolymer are condensed with elimination of water.

4. A process for preparing a synthetic drying oil which comprises mixing about 25 parts of cyclopentadiene with a toluene solution containing 100 parts of an acetylated copolymer prepared by stirring a mixture of about 15% styrene and 85% isobutylene in the presence of aluminum chloride catalyst at a temperature of about −20° C. and acetylating the resulting copolymer in carbon tetrachloride at about 0° C. with the aid of about 30 parts of acetyl chloride per 100 parts of copolymer in the presence of aluminum chloride, and heating the solution of cyclopentadiene and acetylated copolymer at 30 to 35° C. in the presence of sodium octyl alcoholate until the cyclopentadiene and the carbonyl groups of the acetylated copolymer are condensed with elimination of water.

5. A coating composition comprising a synthetic drying oil which is a copolymer of about 90 to 70% combined isobutylene and 10 to 30% of combined styrene having a molecular weight between about 2,500 and 5,000, said copoylmer having between 3 and 10 mole percent of

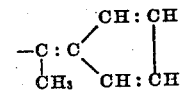

radicals attached to the combined styrene nuclei.

JOSEPH F. NELSON.
ANTHONY H. GLEASON.

References Cited in the file of this patent

UNITED STATES PATENTS

| Number | Name | Date |
| --- | --- | --- |
| 2,495,286 | Brubaker | Jan. 24, 1950 |
| 2,512,698 | Thompson | June 27, 1950 |
| 2,542,782 | Schreiber | Feb. 20, 1951 |

OTHER REFERENCES

Thiele: Berichte 33, pages 666–667 (1900).